UNITED STATES PATENT OFFICE.

BENJAMIN F. SPENCER, OF DENVER, COLORADO, ASSIGNOR TO THE WESTERN PARENT CRUDE RUBBER COMPANY, OF SANTA FE, TERRITORY OF NEW MEXICO, A CORPORATION OF THE TERRITORY OF NEW MEXICO.

RUBBER-LIKE GUM.

No. 834,769.      Specification of Letters Patent.      Patented Oct. 30, 1906.

Application filed April 29, 1905. Serial No. 258,117.

*To all whom it may concern:*

Be it known that I, BENJAMIN F. SPENCER, a citizen of the United States, residing at Denver, in the county of Denver and State of Colorado, have invented certain new and useful Improvements in Rubber-Like Gum; and I do hereby declare the following to be a full, clear, and exact description of the invention, such as will enable others skilled in the art to which it appertains to make and use the same.

This invention relates to a new rubber-like gum, and contemplates the production of the same in a more or less pure form for various purposes, but chiefly as a substitute for caoutchouc, gutta-percha, and other like substances, the said rubber-like gum being manufactured from a plant or shrub which, so far as I am aware, was never before employed for any useful purpose until the time when I conceived the present invention.

I have invented and will describe a simple and economical process for producing more or less pure gum at a comparatively small cost.

The particular plant or shrub which has been first used by me in a practical way for obtaining rubber-like gum as a substitute for caoutchouc, gutta-percha, and the like is one that is found in Colorado and, since my discovery thereof, has become commonly known in that locality as the "Colorado rubber-plant." This plant is found in its native state in the region around Buena Vista, Colorado, and according to certain accepted authorities in the State of Colorado has been identified as a *Picradenia*, closely allied to a *P. floribunda*, (Gray,) Greene, part of the aggregate *Actinella Richardsoni* of *Gray's Synoptical Flora*. Although this plant has been collected on various occasions, it has been confused with *P. Richardsoni* and *Floribunda*, from which it is at least subspecifically distinct.

Quoting from one of the Colorado State authorities, the plant may be described as follows: "*Picradenia floribunda utilis*, N. Subsp., similar in appearance and mode of growth to *P. floribunda*, (a topotype collected by Heller at Santa Fe, New Mexico, compared,) but easily distinguished by the pale yellowish, broad, and subovate outer bracts, with strongly-concave outer margins and the back conspicuously keeled. These bracts are united about to the middle. (In *P. floribunda* these bracts are greener, long, and pointed, with straight sides and not united quite so far as the middle.) The disk corollas have a rusty-red ring in the throat, which appears to be absent in *floribunda;* rays narrower, about two millimeters in diameter. As far as the specimens seen go the basal part of the stems is much more robust in *utilis* than *floribunda*. Compared with *P. macrantha* and *P. ligulaeflora*, the rubber-plant differs conspicuously in its taller stature and smaller flowers. It is also readily distinguished from *P. Davidsoni* and the other described species of the genus. In *P. Davidsoni* (cotype examined) the outer bracts are narrower and shorter than the inner, and the inner are much more pointed than those of *utilis*. The disk corollas of *Davidsoni* are considerably broader at the top than those of *utilis*. The length of the disk corollas in *Davidsoni* is three and a half millimeters, in *utilis* and *floribunda* four, in *ligulaeflora* five. In *P. ligulaeflora* and *macrantha* the receptacle is hemispherical and somewhat fimbrillose, these species having in part the characters of *Gaillardia*. In *floribunda* and *utilis* the receptacle is conical and bare."

Accepting the authoritative description thus set forth, I shall in describing my new article of manufacture or composition of matter employ the name *Picradenia floribunda utilis* in referring to this plant or shrub, this being, as I understand it, the botanical name by which the plant or shrub is to be recognized, which plant is now commonly known as the "Colorado rubber-plant" and sometimes is referred to as the "*Actinella Richardsoni*."

In obtaining the gummy portion of the plant for producing the plastic rubber-like mass forming the subject-matter of the present invention I first prepare a suitable quantity of the plant *Picradenia floribunda utilis* by cleaning and drying the same, preferably using the root and crown of the plant, as these portions appear to contain a high percentage of the gummy matter. It will be understood, however, that the entire plant can be employed, if desired. The dried and cleansed portions of the plant are then ground up, disintegrated, or otherwise comminuted in any suitable manner for reducing the same to a powder-like or granulated condition. I contemplate employing any suitable or appropriate machinery or any desired means for thus preparing the material, and such preparation of the same is found advantageous for placing the material in a condition for thoroughly and readily extracting the gummy portions thereof.

The plant thus prepared is in condition for treatment in various ways for separating the fiber from the gum and producing a coherent mass or masses formed by agglomerating the separated gummy particles of the plant. The said material in its pulverulent condition may be treated with certain extracting agents or with water, as found most desirable, for accomplishing the separation of the gummy product. I shall first refer to the treatment of the comminuted plant with certain extracting agents, such extracting agents being chiefly those of the hydrocarbon class, as benzin, gasolene, or the like, or alcohol, the object being to thoroughly dissolve the gummy matter of the ground or comminuted material. In making such a treating solution in which alcohol is employed a few drops of the alcohol may be added for every quart of benzin or other hydrocarbon employed. The hydrocarbon alone will insure a dissolving of the gummy matter of the plant *Picradenia floribunda utilis* which has been reduced to the ground or comminuted form, but a somewhat longer time is required in accomplishing the result when the hydrocarbon alone is used than when the alcohol is added. When alcohol is employed in the solution, I generally prefer the variety termed "wood-alcohol." By this treatment a pulp-like mixture is obtained, and it may then be allowed to stand until the gummy portions of the plant are thoroughly dissolved and extracted from the fiber thereof. The time required for this reduction of the gummy material may vary in different cases from six to twenty-four hours.

It is only necessary after carrying out the extracting process to separate or drive off the volatile extracting solvent, and this is readily accomplished by subjecting the solution to a suitable distillation. This leaves the gummy portions as a residue and in an agglomerated form or condition, and the volatile hydrocarbon solvent or other extracting agent may be collected and condensed, if desired, for further use.

The new rubber-like gum constitutes a waterproof gummy material and is a new article of manufacture which is found capable of use in various connections and for various purposes—as, for example, a substitute for rubber, caoutchouc, or gutta-percha—and may be employed in the manufacture or treatment of various well-known articles of utility or for any other purpose for which it may be found suitable.

As above intimated, the comminuted plant may, however, be effectively treated by using water instead of applying a hydrocarbon extracting agent. When so treating the plant, the ground or comminuted material is mixed in such a proportion as to produce a sort of pulp. The pulp is then subjected to compression and a simultaneous rubbing or working action, so as to thoroughly separate the minute gummy particles of the plant and permit them to collect in a coherent mass or masses. The effect of the treatment just described may be increased by raising the temperature of the pulp during the rubbing or working process. Instead of applying the heat by a heating agent to the pulp it will be readily understood that the water employed in forming the pulp may be used in a hot condition. In this way the gummy particles will be rendered more adhesive when rubbed or kneaded and the desired agglomeration will be greatly facilitated.

It will be evident that I may employ any desired mechanism for rubbing, kneading, or otherwise working the pulp, and it is especially desirable when using hot water to have some mechanical agent for effecting the desired result. The pulp can of course be kneaded or worked in a suitable receptacle to which heat may be applied externally for raising the said pulp to a temperature which may be found best suited to the proper agglomeration of the gummy masses.

The process in which the comminuted plant is treated with water, as just described, makes it possible to obtain the gum in a peculiarly pure and unadulterated condition, and the fibrous material of the plant can be thoroughly separated from the gummy material.

I do not wish to be understood as limiting myself to the within-described modes of treating the comminuted rubber-plant, though the said modes are found very effective for accomplishing the desired result. Whatever the process employed, the important feature of the invention is the production as a new article of manufacture of a composition of matter comprising a rubber-like waterproof gum resulting from the extraction and agglomeration of the gummy portion of a plant—such, for instance, as the plant *Picradenia floribunda utilis*, as above set forth. I claim to have first discovered a suitable or desired manner of extracting and accumulating the gummy portions of the plant referred to and producing therefrom a useful article of manufacture or useful composition of matter.

Whatever process is employed, it will be understood that a rubber-like gum is obtained in a simple and economical manner by treating the plant *Picradenia floribunda utilis*.

Having thus fully described my invention, what I claim as new, and desire to secure by Letters Patent, is—

1. As a new article of manufacture, a plastic rubber-like body, consisting essentially of the gummy particles contained in the plant *Picradenia floribunda utilis*, separated and agglomerated into a coherent mass, insoluble in water, but soluble in light hydrocarbons such as gasolene, substantially as described.

2. A new manufacture or composition of matter, consisting of a rubber-like and waterproof gum, said gum comprising the agglomerated gummy portions of the plant *Picradenia floribunda utilis* and the residual portions of a volatile hydrocarbon solvent, substantially as described.

3. As a new article of manufacture, a plastic rubber-like body, consisting essentially of the pure or unadulterated particles contained in the plant *Picradenia floribunda utilis*, separated and agglomerated into a coherent mass, insoluble in water but soluble in light hydrocarbons, such as gasolene, substantially as described.

4. As a new article of manufacture, a rubber-like gum comprising the adhesive particles of the plant *Picradenia floribunda utilis* separated and collected in a plastic mass.

5. As a new article of manufacture, a mass comprising the gummy particles of the plant *Picradenia floribunda utilis* separated from the fibrous portions thereof and agglomerated or collected for use.

In testimony whereof I affix my signature in presence of two witnesses.

BENJAMIN F. SPENCER.

Witnesses:
 CARLE WHITEHEAD,
 CHESTER E. SMEDLEY.